United States Patent [19]

Gaither

[11] Patent Number: 4,527,607
[45] Date of Patent: Jul. 9, 1985

[54] TIRE TOOL

[76] Inventor: Dolphard Gaither, Rt. 1, Box 43, Cameron, Okla. 74932

[21] Appl. No.: 428,643

[22] Filed: Sep. 30, 1982

[51] Int. Cl.³ .............................................. B60C 25/04
[52] U.S. Cl. .................................................... 157/1.3
[58] Field of Search ................. 157/1.1, 1.3; 254/131, 254/131.5, 132

[56] References Cited

U.S. PATENT DOCUMENTS

| | | | |
|---|---|---|---|
| 965,858 | 8/1910 | Bellew | 157/1.3 X |
| 1,567,025 | 12/1925 | Allison | 157/1.3 |
| 2,112,661 | 3/1938 | Abrahams | 157/1.3 X |
| 2,545,483 | 3/1951 | Martin | 157/1.3 |
| 3,168,285 | 2/1965 | Russac et al. | 254/131 |
| 3,680,838 | 8/1972 | Dunn | 254/131 |
| 3,823,756 | 7/1974 | Rainey | 157/1.3 |
| 4,126,297 | 11/1978 | Barnes | 254/131 |
| 4,360,052 | 11/1982 | Norris | 157/1.3 |

Primary Examiner—James G. Smith
Attorney, Agent, or Firm—Head, Johnson & Stevenson

[57] ABSTRACT

A tire tool for facilitating the removal of a tire from a wheel rim and particularly a large diameter tire from its associated wheel rim, the tool having a substantially flat main body portion provided with an aperture in the proximity of one end and an arcuate flange at the opposite end, an arm member extending outwardly from the body in a direction away from the flange and at a planar angle with respect to the body, a plurality of first roller members journalled at the outer end of the arcuate flange for engagement with the inner wall of the tire during a tire removal operation, and a plurality of second roller members journalled at the outer end of the arm member for engagement with the wheel rim and moving axially therealong during the tire removal operation, the bore being adapted for engagement by an elongated lever member for pivoting the tire tool in a direction for moving the second roller members axially along the wheel rim as the first roller members deform the tire for disengagement of the tire from the wheel rim, the tool being provided with bumper members for facilitating the tire removal operation.

10 Claims, 28 Drawing Figures

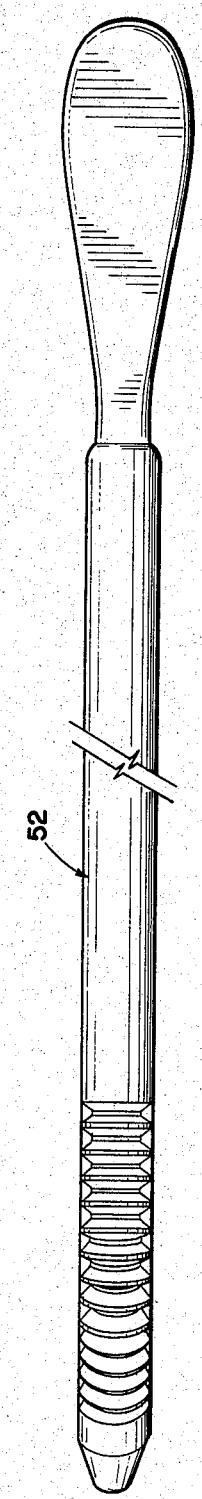
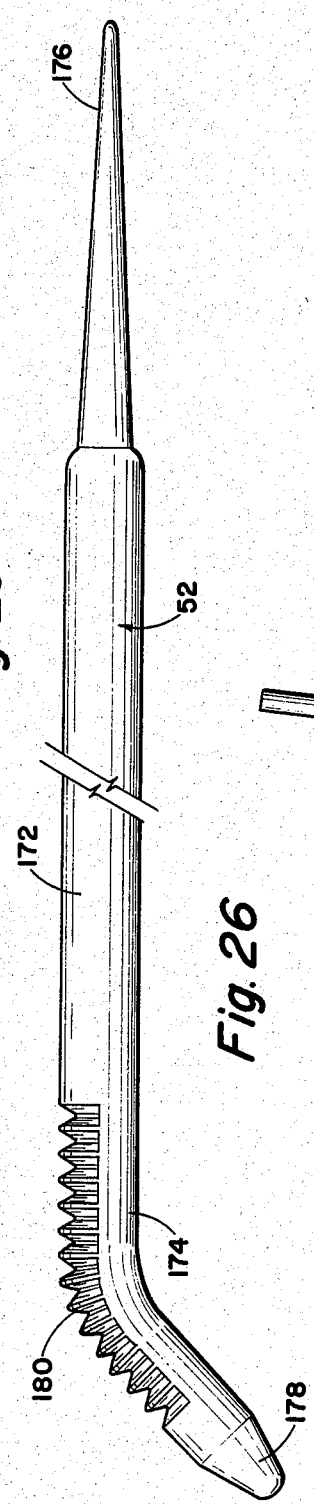
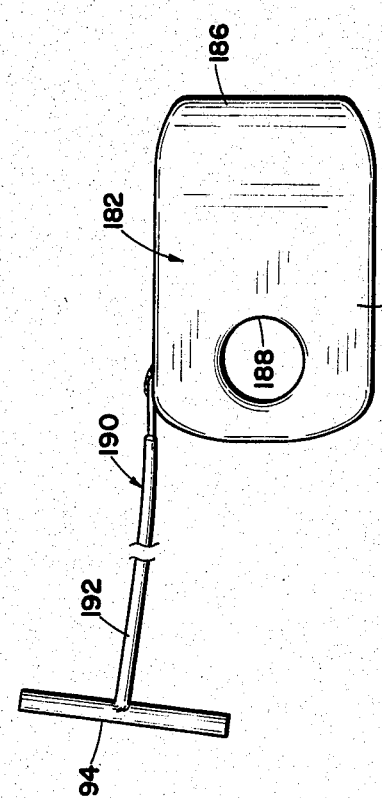
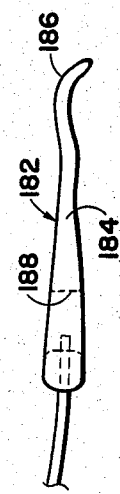
Fig. 25
Fig. 26
Fig. 27
Fig. 28

TIRE TOOL

CROSS-REFERENCE TO RELATED APPLICATION

This application is related to my co-pending application Ser. No. 324,620, filed November 24, 1981, and entitled "Tire Tool", now U.S. Pat. No. 4,436,134.

BACKGROUND OF THE INVENTION

1. Field of the Invention

This invention relates to improvements in tire tools and more particularly, but not by way of limitation, to a tire tool for facilitating both the removal and installation of a large tire on a wheel rim.

2. Description of the Prior Art

The removal and installation of tires on wheel rims is a difficult and time consuming operation, particularly the removal and installation of large diameter tires such as found on large highway and off-highway vehicles. The usual passenger automobile tire is sufficiently small and light weight as to permit manually positioning thereof at an elevation above the normal floor or ground level and on a substantially horizontally disposed machine having a tool mounted thereon which may be utilized for breaking the seal between the tire and wheel rim. Once the seal has been broken between the bead of the tire and the wheel rim, the tool may be manually moved around the outer periphery of the tire bead for separating the tire from the wheel rim, and the application of a suitable manual pressure against the loosened tire permits the removal of the tire from the wheel rim. Large truck tires, and the like, however, are heavy and unwieldy and as a rule cannot be manipulated in this manner, and as a result it frequently requires many hours of manual labor for the removal and installation of a single tire of this type. The disadvantages will be readily apparent.

Many tools have been developed for facilitating the removal and installation of tires from the associated wheel rims, such as the Threlfall Pat. No. 786,611; the Hussey Pat. No. 834,908; the Dickey et al Pat. No. 1,587,634; the Wendelken Pat. No. 2,615,507; the Schulta et al Pat. No. 3,029,860; and the McKinney Pat. No. 3,104,695. These tire tools, however, ride around the periphery of the tire and wheel rim and have not been found to be efficient or effective for the removal and installation of the large tires in widespread use today.

In order to overcome these disadvantages, the tire tool shown in my co-pending application Ser. No. 324,620, was developed whereby large tires may be readily removed and installed on the associated wheel rim with ease and in a matter of minutes, even by a person of relatively small stature. In some instances, the tire may be removed in less than one minute. The novel tire tool has been received in the industry with enthusiasm and there has been considerable demand therefor. However, continual usage of the tool has indicated a few areas wherein the overall operation thereof may be improved for more efficient results.

SUMMARY OF THE INVENTION

The present invention contemplates improvements and modifications of the tire tool shown in my aforesaid co-pending application. The novel tire tool comprises a substantially flat body having an arcuate flange at one end thereof and an aperture at the opposite end thereof. A plurality of rollers are journalled at the outer end of the arcuate flange for engagement with the inner sidewall of the tire. A substantially flat arm extends angularly outwardly from one face of the flat body, and is oppositely disposed with repsect to the rollers of the arcuate flange. A plurality of similar rollers are provided or journalled at the outer end of the angularly disposed flat arm for engagement with the wheel rim. A bumper means is secured to the angularly disposed flat arm for engagement with the wheel rim during the tire removal operation, and in some embodiments of the invention the bumper means is rigidly secured to the angularly disposed arm and in other embodiments the bumper means is pivotally secured thereto. In still another embodiment of the invention, the rollers carried by the angularly disposed arm are mounted on a flange means which is pivotally secured to the said arm. In still another embodiment of the invention, a second bumper means is pivotally secured to the main body of the tool for cooperation therewith during the tire removal operation.

In use, it is preferable that the engagement between the tire bead and the wheel be initially "broken" by means of an auxiliary tool provided for that purpose. Subsequent to the loosening of the engagement between the tire and the wheel, the tire tool is placed against the outer periphery of the wheel rim, with the flat arm being in engagement with the edge of the rim. Pressure is then applied against the body, such as by the foot of the operator, for forcing the rollers of the arcuate flange into a position between the tire bead and the wheel rim. This is accomplished quite easily. When the tool has thus been installed with respect to the tire and wheel rim, any suitable lever, length of bar stock, or the special tool as shown herein, may be engaged with the aperture provided in the outer end of the main flat body. The lever or bar stock member is then pivoted about the connection point with the body and in a radially inward direction with respect to the wheel. This, in essence, ultimately places the lever or bar member substantially diametrically across the wheel. As the lever is initially pivoted in this radial direction with respect to the wheel, the rollers of the flat arm are moved into engagement with the inner periphery of the wheel rim, and a continued movement in this direction by the lever moves the rollers of the arcuate flange into engagement with the inner surface of the sidewall of the tire. The continued movement of the lever may be accomplished by the movement of the operator around the outer periphery of the wheel to a position substantially diametrically opposed with respect to the engagement of the tire tool with the tire and wheel rim in order to achieve the diametrically disposed position of the lever with respect to the wheel. This end position for the lever brings the arcuate flange into engagement with the inner sidewall of the tire instead of the rollers, and this lifts the bead of the tire completely away from the outer periphery of the wheel rim. The tire may then be easily manually moved axially along the outer periphery of the cylindrical portion of the wheel rim, whereupon the lever means may be utilized for completing the removal of the tire from the rim. It is to be noted that the rollers of the flat arm which engage the wheel rim move axially along the outer periphery of the wheel rim, as opposed to any movement around the circumference of the wheel rim. Of course, whereas substantially any length of bar stock may be utilized for the lever means, it is preferable that the tool be an elongated tool having a curved or arcuate portion at one end thereof and a flattened member at the opposite end thereof as particularly shown herein. The flattened end of the bar may be useful in the installation of the tire on the rim, and the curved end is useful in combination with the tire tool for removal of the tire therefrom. The novel tire tool and associated lever means and "bead breaker" tool are simple and efficient in operation and economical and durable in construction.

BRIEF DESCRIPTION OF THE DRAWINGS

FIG. 25 is a plan view of a lever which may be utilized in combination with the tire tool embodying the invention.

FIG. 26 a side elevational view of the lever shown in FIG. 25.

FIG. 27 is a side elevational view of a modified "bead breaker" tool which may be utilized in combination with the tire tool embodying the invention.

FIG. 28 is a plan view of the "bead breaker" tool shown in FIG. 27.

DETAILED DESCRIPTION OF THE PREFERRED EMBODIMENT

Figure 1:
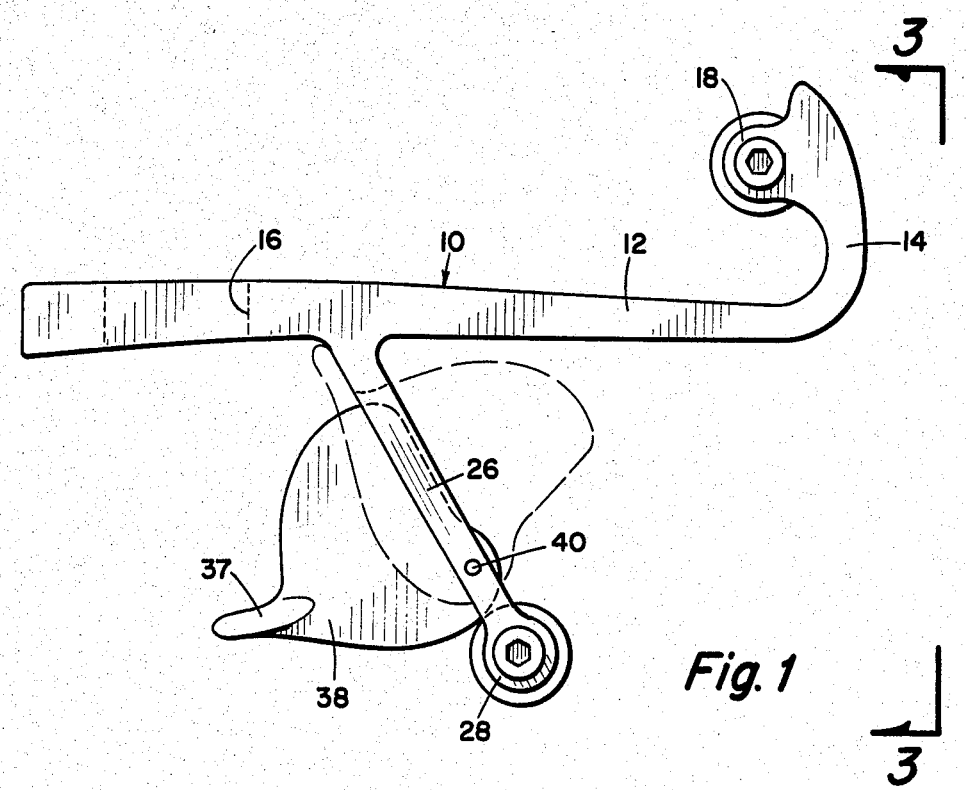
FIG. 1 is a side elevational view of a tire tool embodying the invention.
Figure 2:
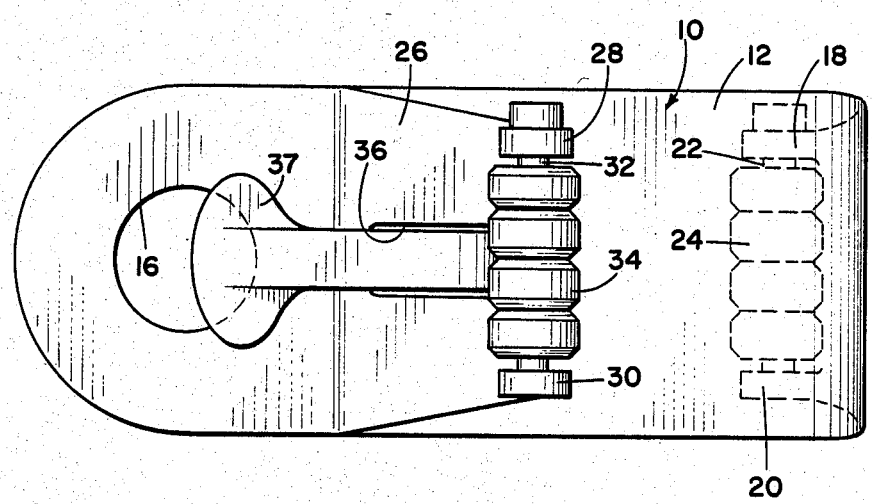
FIG. 2 is a plan view of the tire tool shown in FIG. 1.

Referring to the drawings in detail, and particularly FIGS. 1 through 9, reference character 10 generally indicates a tire tool comprising a main body portion 12 having an arcuate flange 14 provided at one end thereof and a bore 16 extending therethrough in the proximity of the opposite end thereof. A pair of spaced flanges 18 and 20 are provided at the outer end of the arcuate flange 14 for receiving a shaft 22 therebetween. A plurality of rollers 24 are journalled on the shaft 20 for a purpose as will be hereinafter set forth.

An angularly disposed arm 26 extends in a direction away from the body 12 and is oppositely disposed with respect to the arcuate flange 14 as particularly shown in FIG. 1. A pair of spaced flanges 28 and 30 are provided at the outer end of the angularly disposed arm 26 for receiving a shaft 32 therebetween. A plurality of roller members 34 are journalled on the shaft 32 for a purpose as will be hereinafter set forth. A recess or slot 36 is provided in the arm 26 and a bumper member 38 is pivotally secured to the arm 26 as shown at 40 and is movable through the recess 36.

Figure 4:
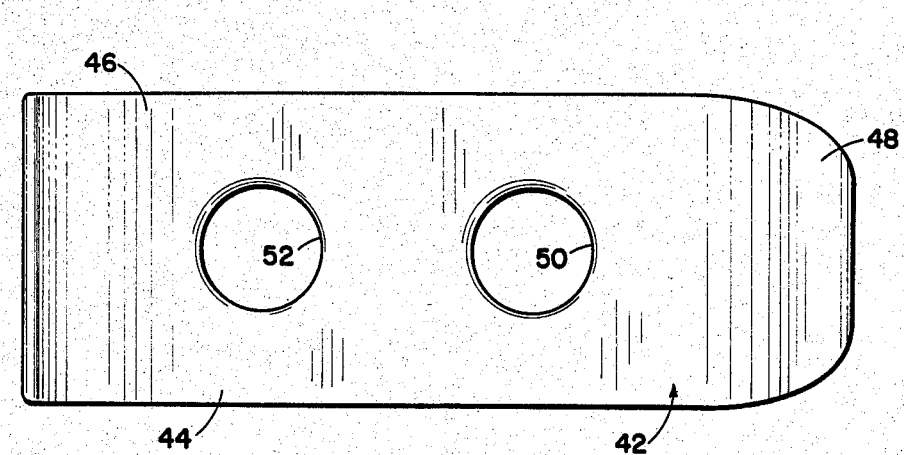
FIG. 4 is a plan view of a "bead breaker" tool for use in combination with the tire tool of the invention.
Figure 5:
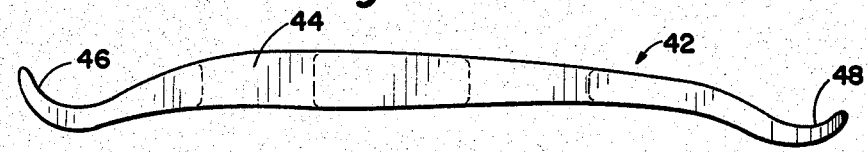
FIG. 5 is a side elevational view of the "bead breaker" tool shown in FIG. 4.
Figure 3:
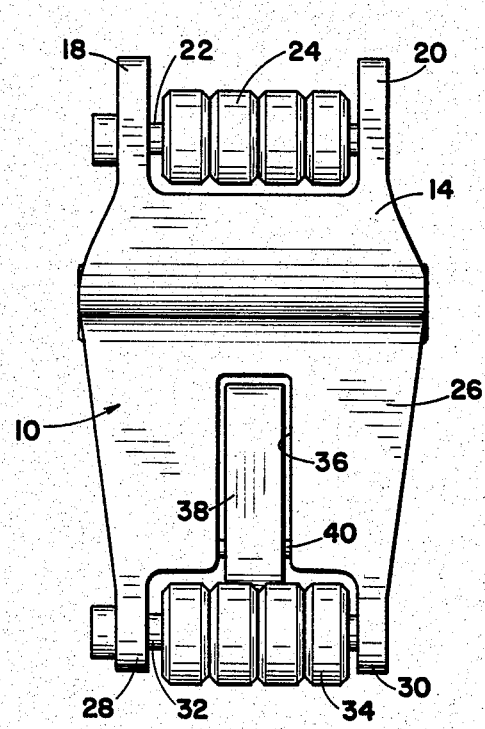
FIG. 3 is a view taken on line 3—3 of FIG. 1.
Figure 12:
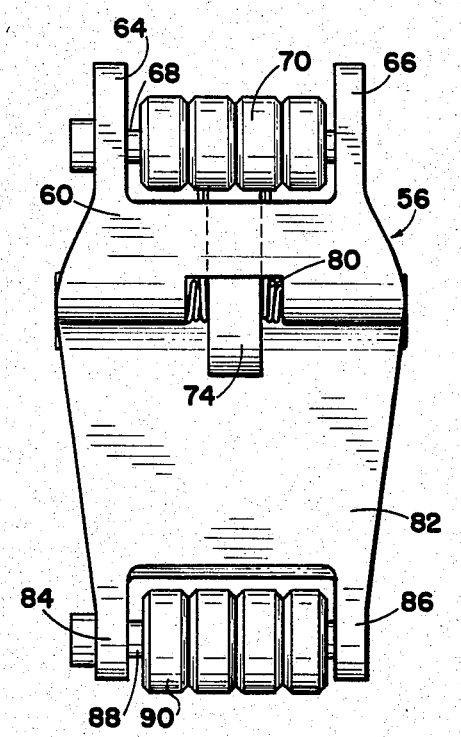
FIG. 12 is a view taken on line 12—12 of FIG. 10.

A bead breaker tool generally indicated at 42 in FIGS. 4 and 5 is preferably used in combination with the tool 10 in order to remove a tire 44 from a wheel rim 46 in the manner as will be hereinafter set forth. The bead tool 42 comprises a main body portion 44 having arcuate portions 46 and 48 provided at the opposite ends thereof, the arcuate configurations of each end 46 and 48 being directed in a common direction, as will be seen in FIG. 5. In addition, it is preferable to provide two apertures 50 and 52 extending transversely through the body 44 for a purpose as will be hereinafter set forth.

Figure 6:
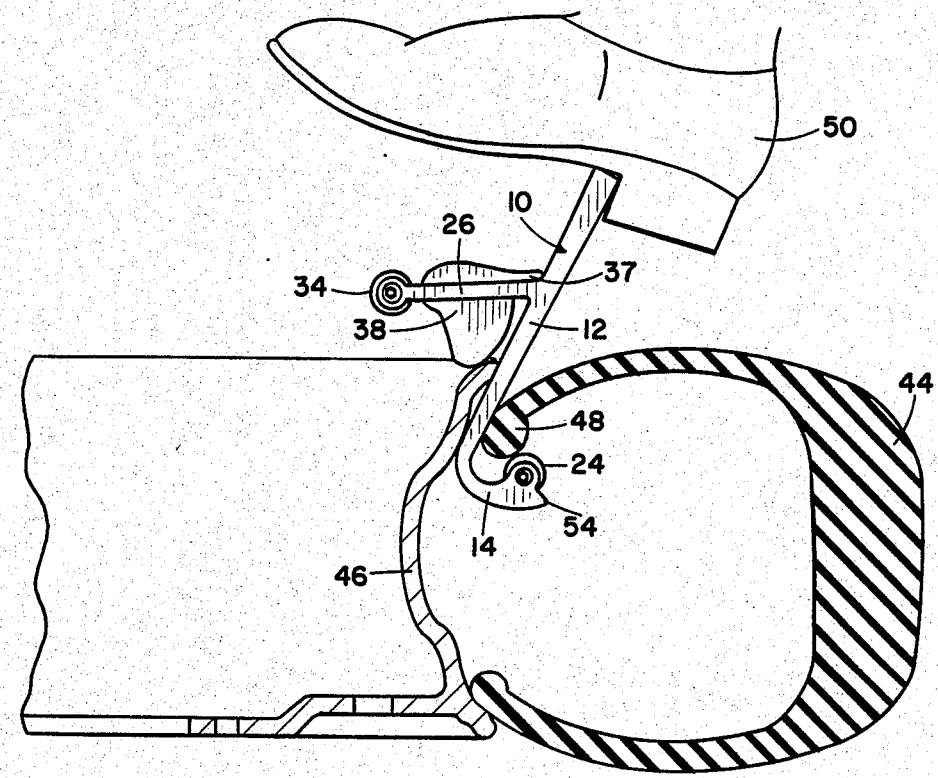
FIG. 6 is a sectional elevational view of a portion cf a wheel rim and tire illustrating the initial step of use of the tire tool shown in FIGS. 1, 2 and 3.
Figure 7:
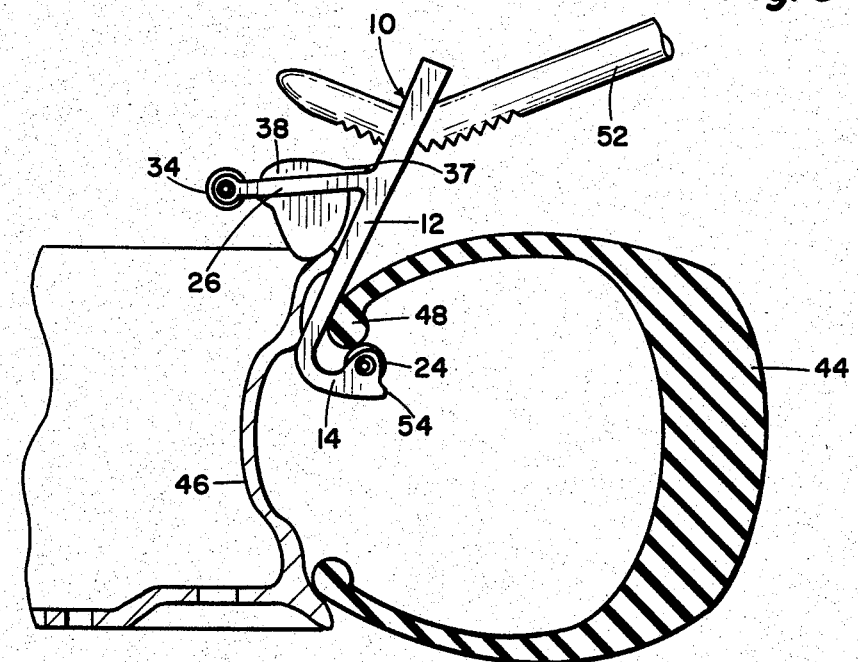
FIG. 7 is a view similar to FIG. 6 illustrating the next succeeding step in the removal of the tire with the tire tool shown in FIGS. 1, 2 and 3.

In using the tool 10 for removable of the tire 44 from the wheel rim 46, the tool 42 is preferably initially used to break the sealed engagement between the tire bead 48 and the wheel rim 46. This may be accomplished in substantially any well known manner and preferably by manually positioning one of the arcuate ends 46 or 48 at the juncture between the wheel rim 46 and 44 and lifting up manually on the opposite end for essentially rolling the tire bead 48 away from the wheel rim 46 to break the tight engagement therebetween. When this has been accomplished, the tool 10 may be positioned with respect to the tire 44 and 46 in such a manner that the arcuate arm member 14 and 15 rollers 24 carried thereby are disposed in the interior of the tire 44 as shown in FIG. 6. At this initial engagement of the tool with the tire and wheel rim, the body 12 is in simultaneous engagement with the bead 48 and wheel rim 46 and the rollers 24 are in engagement with the bead 48. The bumper member 38 falls by gravity into engagement with the inner peripheral portion of the wheel rim 46. It is to be noted that the bumper 38 is preferably provided with an outwardly extending stop member 37 which engages the arm 26 to limit the movement of the bumper member in one direction. In the insertion operation of positioning the arcuate arm 14 and rollers 24 in the interior of the tile 44, the operator may find it convenience to place his foot 50 on the outer end of the body 12 and force the arm 14 through and between the bead 48 and 46 and into the position shown in FIG. 6. This operation is relatively simple to accomplish.

Figure 8:
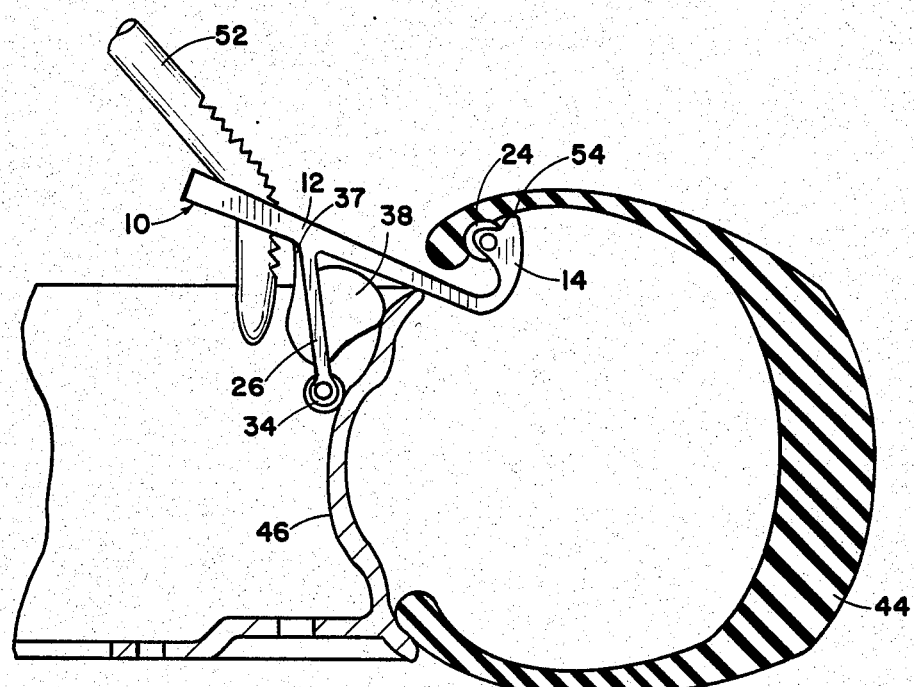
FIG. 8 is a view similar to FIGS. 6 and 7 showing the next succeeding step in the removal of the tire.
Figure 9:
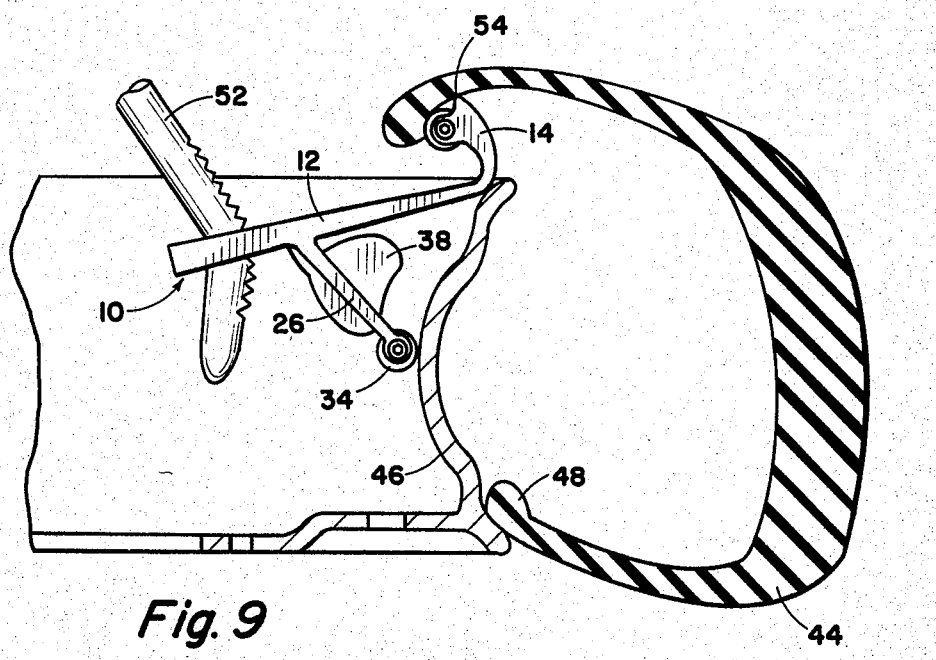
FIG. 9 is a view similar to FIGS. 6, 7 and 8 showing the next succeeding step in the removal of the tire.

The next step in the removal of the tire 44 from the wheel rim 46 requires the engagement of the bore 16 with any suitable lever member but preferably the lever 52 as particularly shown in 25 and 26 and as will be hereinafter more fully set forth in detail. The lever may be engaged with the bore 62 in such a manner that the longer portion of the lever 52 extends radially outwardly from the wheel rim 56 in a direction away from the center of the wheel rim. This particular step is clearly shown in FIG. 7. The lever 52 is then manually moved in a direction across the diameter of the wheel rim 46 as shown in FIGS. 8 and 9 whereby the body 12 pivots about the engagement with the outer edge of the wheel rim 56 as particularly shown in FIG. 8 and moves the rollers 24 further into the inner periphery or inner surface of the tire 44 and somewhat beyond the bead 48. Simultaneously the rollers 34 move axially along the inner periphery of the wheel rim 46, and the bumper 38 follows the rollers 34. This action also moves the tire bead 48 upwardly and away from engagement with the wheel rim 46 at the point wherein the tool 10 is operating and the sections immediately adjacent thereto. A continued movement of the lever arm 52 diametrically across the wheel rim 46 rolls the body 12 further about the wheel rim 46 and the rollers 34 move further along the inner periphery of the wheel rim 46 as shown in FIG. 9. The rollers 24 and outer end 54 of the arcuate portion 14 efficiently, quickly and easily moves the tire bead 48 transversely or radially with respect to the wheel rim 46 and completely away from engagement therewith. The wheel bead 48 is completely removed from the engagement with the outer periphery of the wheel rim 46 and the complete removal of the tire 44 may be easily accomplished once this position for the tire has been achieved.

Referring now to FIGS. 10 through 16, reference character 56 generally indicates a tire tool similar to the tool 10 and comprising a substantially flat main body 58 having an arcuate flange 60 provided at one end thereof and a bore 62 extending therethrough in the proximity of the opposite end thereof. The arcuate flange 62 is provided with a pair of spaced flanges 54 and 56 in the proximity of the outer end thereof for supporting a shaft 68 therebetween. A plurality of rollers 70 are journalled on the shaft generally similar to the rollers 24 and for essentially the same purpose. An elongated slot or opening 72 is provided in the body 58 spaced slightly inwardly from the arcuate flange 60 and a bumper member 74 is disposed in the recess 72 and is pivotally secured therein in any suitable manner such as by a pivot shaft 76. The bumper is preferably provided with a substantially centrally disposed groove or recess 78 extending around the outer periphery thereof and a suitable spring means 80 is disposed in the groove 78 and has the opposite ends thereof suitably anchored in the body 12 preferably at the proximity of the opening or slot 72.

Figure 10:
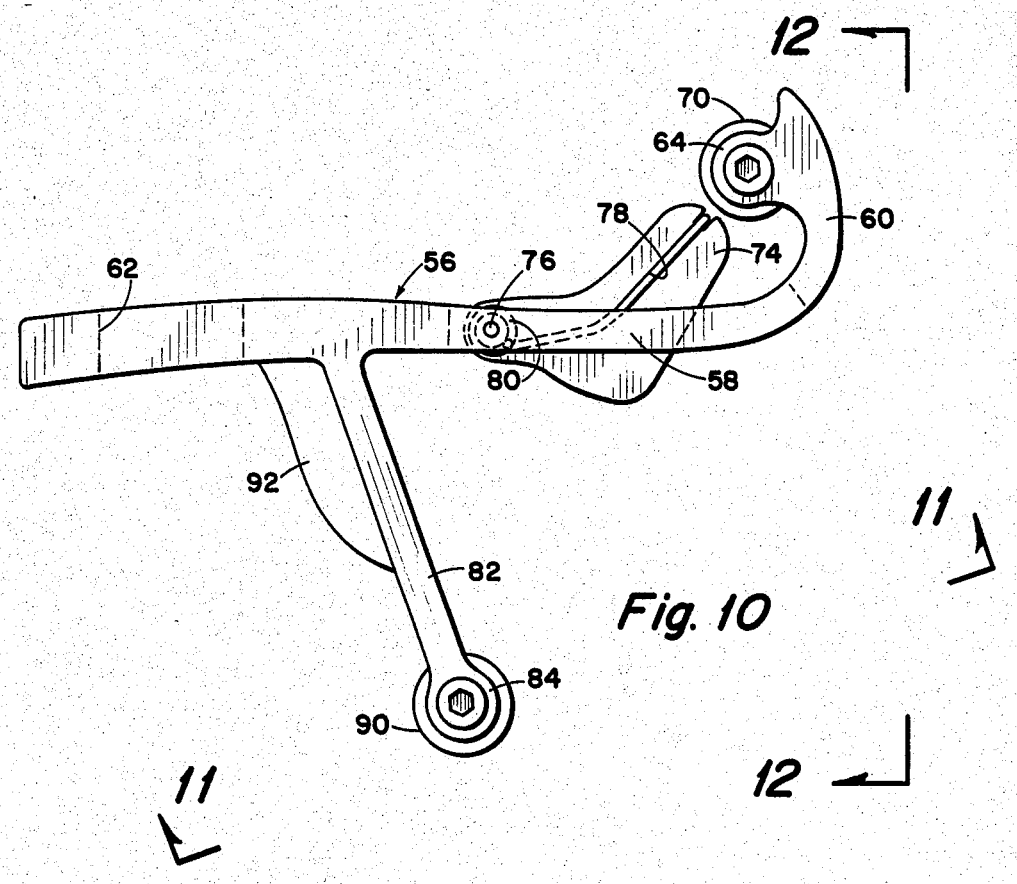
FIG. 10 is a side elevational view of a modified tire tool embodying the invention.
Figure 11:
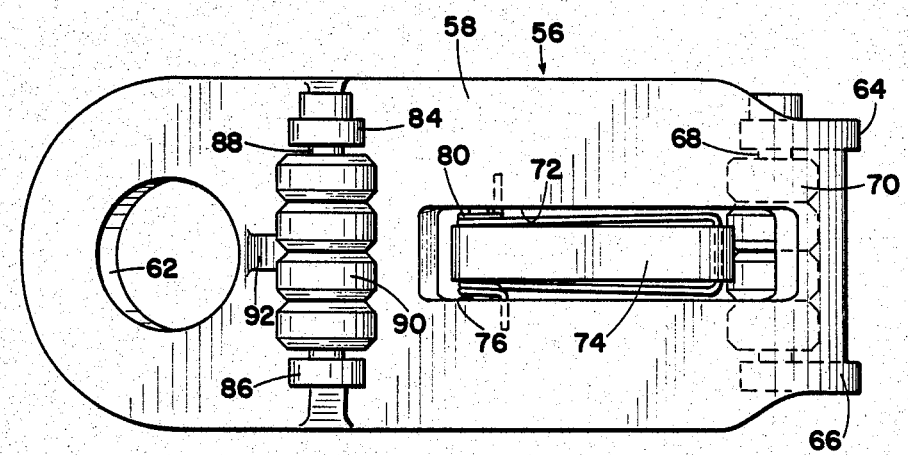
FIG. 11 is a view taken on line 11—11 of FIG. 10.

An arm member 82 generally similar to the arm 26 extends outwardly from the body 58 at an angle with respect thereto and is oppositely disposed from the flange 60 as particularly shown in FIG. 10. A pair of spaced flanges 84 and 86 are provided at the outer end of the arm 82 for supporting a pivot shaft 88 therebetween. A plurality of rollers 90 are journalled on the shaft 88 and are generally similar to the rollers 34 and provide essentially the same function.

Figure 13:
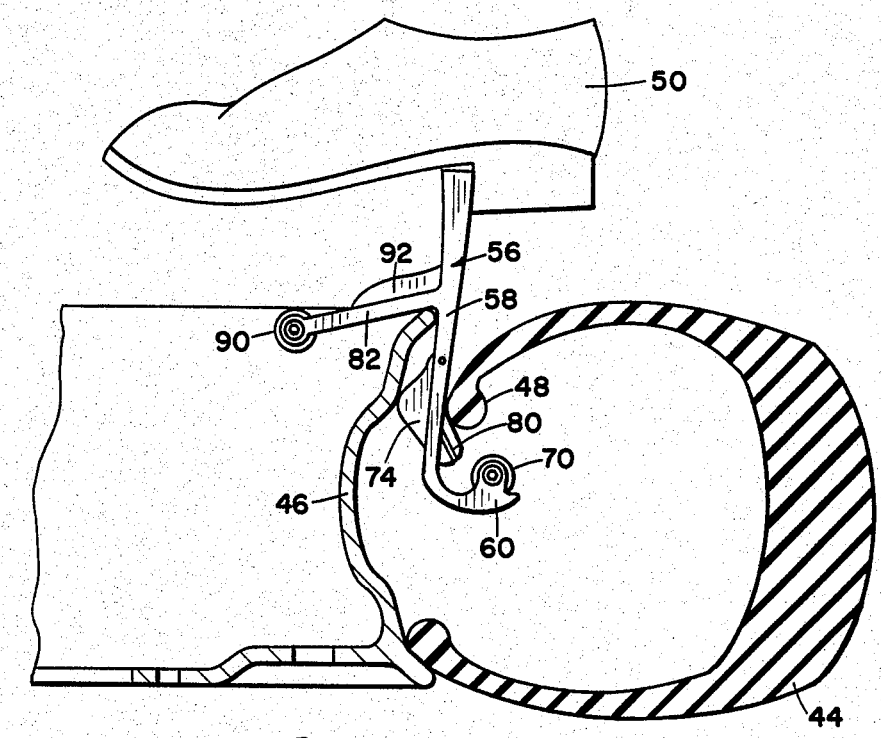
FIG. 13 is a view similar to FIG. 6 showing the initial step in removing a tire by use of the tool shown in FIGS. 10, 11 and 12.
Figure 14:
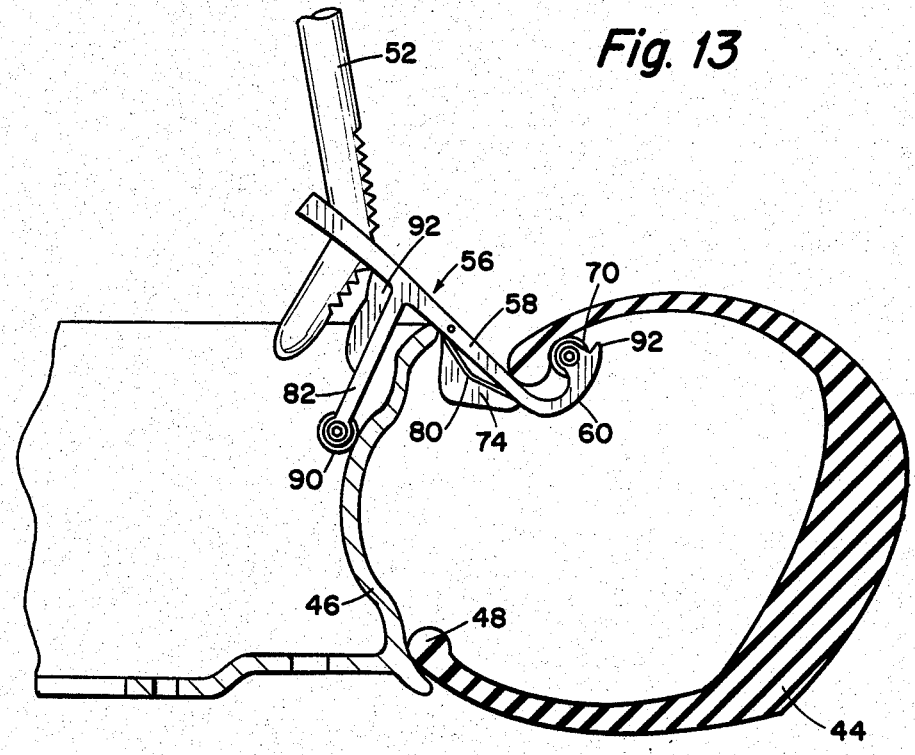
FIG. 14 is a view similar to FIG. 13 showing a next succeeding step in the removal of the tire with the tool shown in FIGS. 10, 11 and 12.
Figure 15:
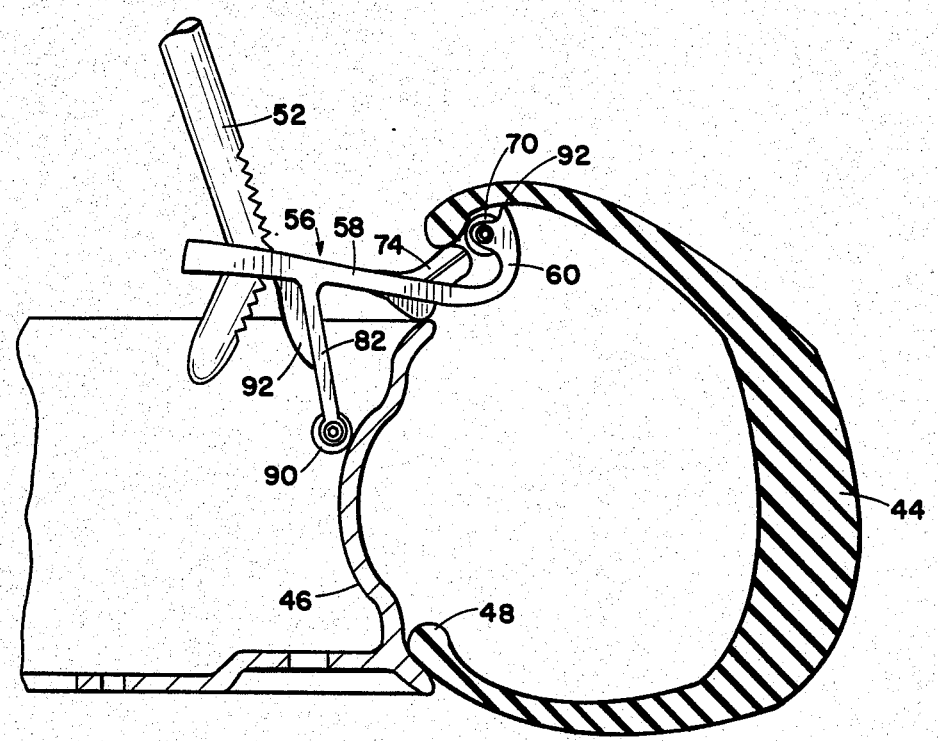
FIG. 15 is a view similar to FIGS. 13 and 14 showing the next succeeding step in the removal of the tire.
Figure 16:
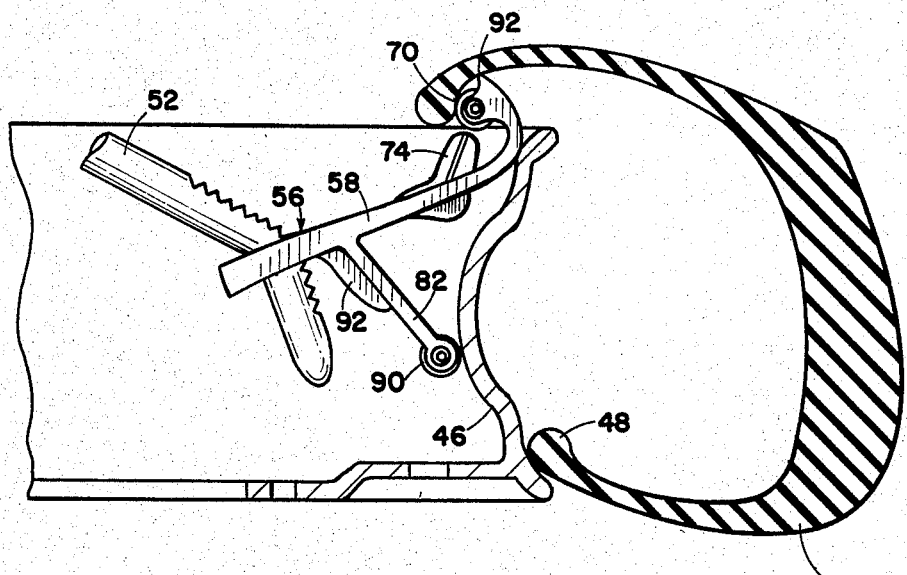
FIG. 16 is a view similar to FIGS. 13, 14 and 15 showing the next succeeding step in the removal of the tire.

FIGS. 13 through 16 illustrate a sequence of operation of removing the tire 44 from the wheel rim 46 through the use of the tool 56. In the initial step subsequent to breaking the engagement of the tire bead 48 with the wheel rim 46 as hereinbefore set forth, the arcuate arm 60 and rollers 72 are forced between the wheel rim 46 and tire bead 48 preferably by pressure from the foot 50 in the manner as hereinbefore set forth. The engagement of the arm 82 with the outer edge of the wheel end 46 will limit the depth of insertion of the tool 56 into the interior of the tire 44 as particularly shown in FIG. 13. In addition, the pivotal bumper member 74 will simultaneously engage the bead 48 and the outer periphery of the wheel rim 46 for fascilitating the insertion of the arm 60 and roller 72 into the interior of the tire 44. Once the tool has been positioned in the manner as shown in FIG. 13, any suitable lever and preferably the lever 52 may be inserted into the bore 62 of the body 58 in the manner as hereinbefore set forth and may be manually moved in a radial direction with respect to the wheel rim 46 and toward an ultimate substantially diametrically disposed position with respect thereto. As the bar or lever 52 begins to move in the said radial direction the body 58 is pivoted about the outer end of the wheel rim 56 as will be particularly seen in FIG. 14. This brings the rollers 70 into engagement with the inner surface of the tire 44 and begins to lrft the bead 48 away from engagement with the wheel rim 46. Simultaneously, the rollers 90 are brought into engagement with the inner periphery of the wheel rim 46 and roll axially towards the interior thereof. A continued movement of the lever 52 in the said radial direction brings the bead 48 upward and away from the wheel rim 46 and the bumper 74 will be in engagement with the wheel rim 46 and the bead 48 for facilitating lifting and disengaging the bead from the wheel rim as particularly shown in FIG. 15. A still further movement of the lever arm toward the diametrically disposed relationship with the wheel rim brings the bead 48 completely away from and radially inwardly from any engagement with the wheel rim and the rollers 90 roll still further along the inner periphery of the wheel rim. This particular position is shown in FIG. 16 and when this relationship between the tire 44 and the wheel rim 46 has been reached, the tire may be readily completely removed from the wheel rim. It is to be noted that the outer end 92 of the arcuate flange 60 also engages the inner surface of the tire 44 during the later steps in the removal of the tire and facilitate the lifting and disengaging of the tire from the wheel.

Figure 17:
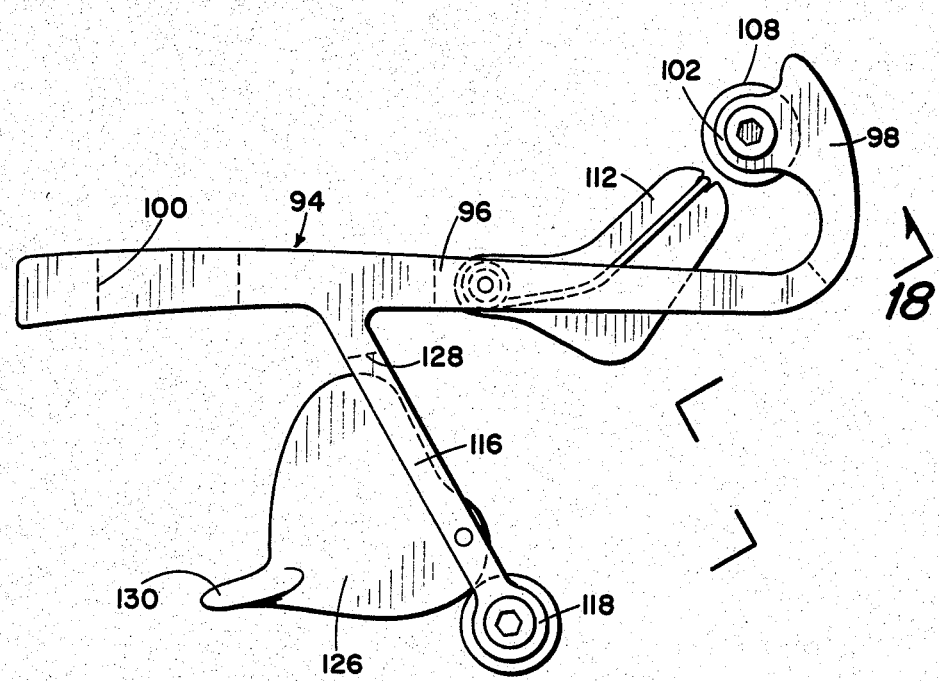
FIG. 17 is a side elevational view of another modified tire tool embodying the invention.
Figure 18:
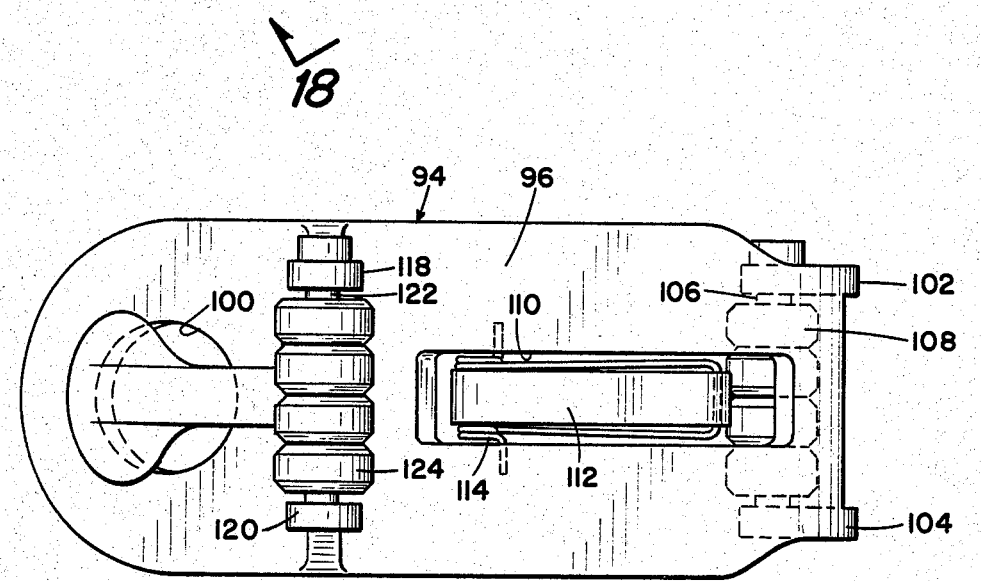
FIG. 18 is a view taken on line 18—18 of FIG. 17.
Figure 19:
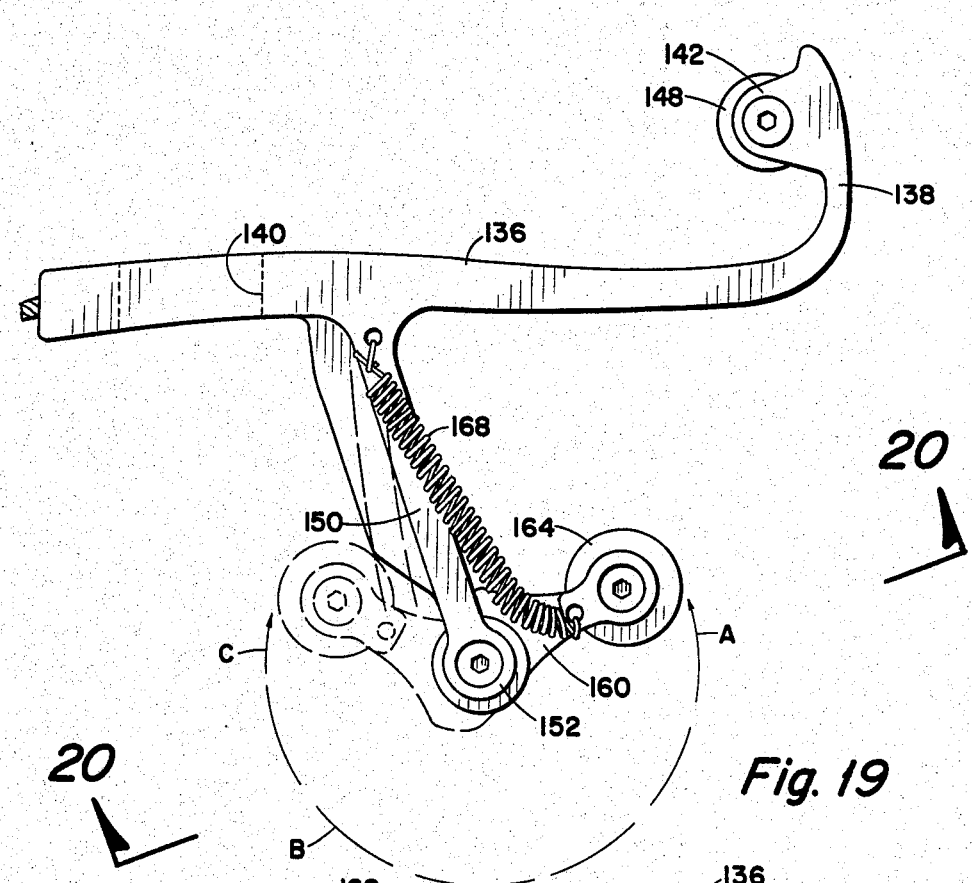
FIG. 19 is a side elevational view of still another modified tire tool embodying the invention.

Referring now to FIGS. 17 and 18 reference numeral 94, generally indicates a tire tool similar to the tools 56 and 10. The tire tool 94 comprises a substantially flat main body 96 having an arcuate flange 98 provided at one end thereof and a bore 100 extending therethrough in the proximity of the opposite ends thereof. A pair of oppositely disposed flanges 102 and 104 are provided at the outer end of the arcuate arm 98 for supporting a pivot shaft 106 therebetween. A plurality of rollers 108 are journalled on the shaft 106 and are substantially identical to the rollers 24 and 70 and provide the same function during removal of the tire 44 from the wheel rim 46. An elongated slot or opening 110 substantially identical to the opening 72 is provided in the body 96 and a pivotal bumper member 112 substantially identical to the bumper member 74 is similarly pivotally secured in the recess 110 and is preferably spring-urged by suitable spring means 114 in the same manner as hereinbefore set forth in connection with the tire tool 56. An arm member 116 substantially identical to the arm members 82 and 26 extends angularly away from the body 96 and is oppositely disposed with respect to the arcuate flange 98. A pair of spaced flanges 118 and 120 are provided at the outer end of the arm 116 for supporting a pivot shaft 122 therebetween. A plurality of rollers 124 substantially identical to the rollers 90 and 34 are journalled on the shaft 122 and function in the same manner as hereinbefore set forth. A bumper member 126 is pivotally secured in a slot or recess 128 provided in the arm 116, the bumper member 126 preferably being substantially identical with the bumper member 38. The bumper 126 is similarly provided with an outwardly extending stop means 130 adapted to engage the arm 116 for limiting the pivotal movement of the bumper member 126 in one direction.

The removal of the tire 44 from the wheel rim 46 with the tool 94 is substantially the same as hereinbefore set forth in connection with the tools 10 and 56. Of course, the bumpers 130 and 112 functions in generally similar manners as the respective bumpers of the tools 56 and 10 for facilitating removal of the tire 44 from the wheel rim 46.

Figure 20:
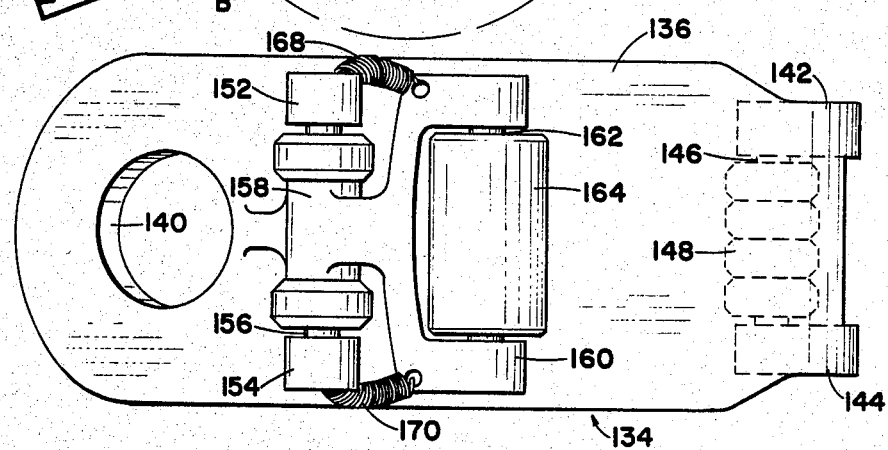
FIG. 20 is a view taken on line 20—20 of FIG. 19.
Figure 21:
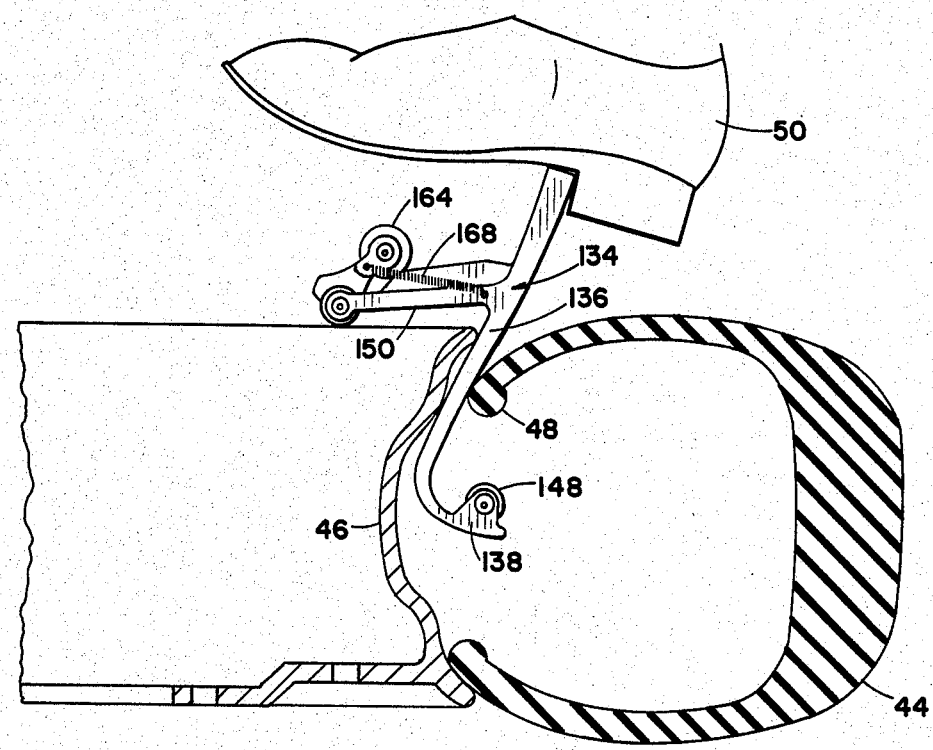
FIG. 21 is a view similar to FIGS. 6 and 13 showing an initial step in the removal of a tire with the use of the tool shown in FIGS. 19 and 20.
Figure 22:
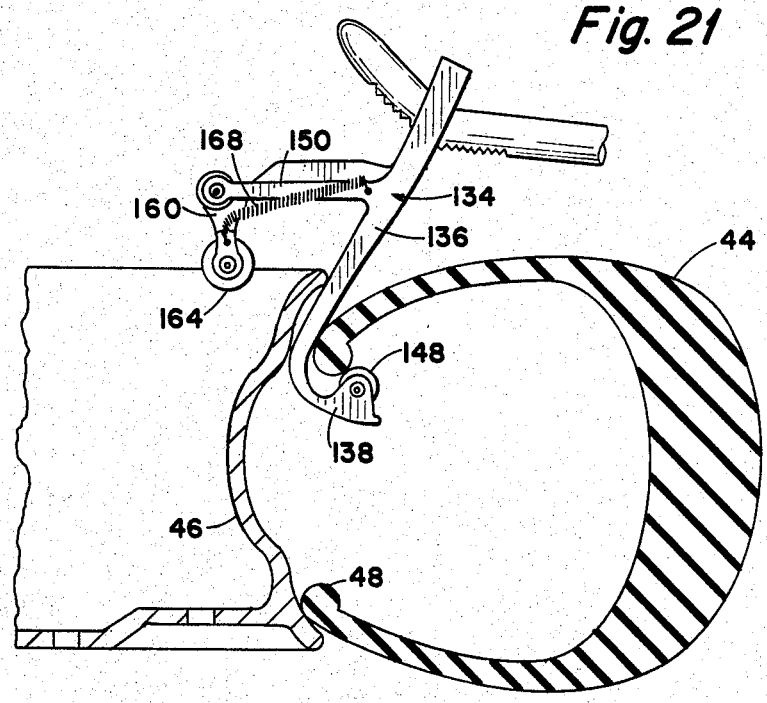
FIG. 22 is a view similar to FIG. 21 illustrating the next succeeding step in the removal of the tire.

Referring now to FIGS. 19 through 24, reference numeral 134 generally indicates still another tool generally similar to the tool 10, 56 and 94 and comprises a substantially flat main body 136 having an arcuate flange 138 provided at one end thereof and a bore 140 extending therethrough in the proximity of the opposite ends thereof. A pair of spaced flanges 142 and 144 are provided at the outer end of the arcuate flange 138 for supporting a pivot shaft 146 therebetween. A plurality of rollers 148 generally similar to the rollers 24, 70 and 108 are journalled on the shaft 146. An arm member 150 generally similar to the arms 26, 82 and 116 extends outwardly from the body 136 at an angle with respect to the plane thereof and is oppositely disposed with respect to the arcuate flange 138 as particularly shown in FIG. 19. A pair of spaced flanges 152 and 154 are provided at the outer end of the arm 150 for supporting a pivot shaft 156 therebetween. A sleeve means 158 is journalled on the shaft 156 and is provided with a yoke means 160 at the outer end thereof for supporting a second pivot shaft 162. An elongated roller means 164 is journalled on the shaft 162 and although the roller means 164 as shown in FIG. 20 is a single roller it will be apparent that a plurality of rollers may be provided in lieu of a single roller if desired. The yoke means 160 is yieldably secured to the arm 150 by suitable oppositely disposed spring means 166 and 168 between the yoke and the arm for constantly urging the yoke means in a direction indicated by the arrow A in FIG. 19. The yoke means 160, however, being pivotally mounted on the shaft 156, is movable throughout substantially 360° about the axis of the shaft 156 as indicated by the dashed lines B in FIG. 19 and to a position oppositely disposed with respect to the normal position, said oppositely disposed position being shown in broken lines in FIG. 19. In this second position for the yoke member 160 the spring means 168 and 170 urge the yoke means in the direction indicated by the arrow C in FIG. 19.

Figure 23:
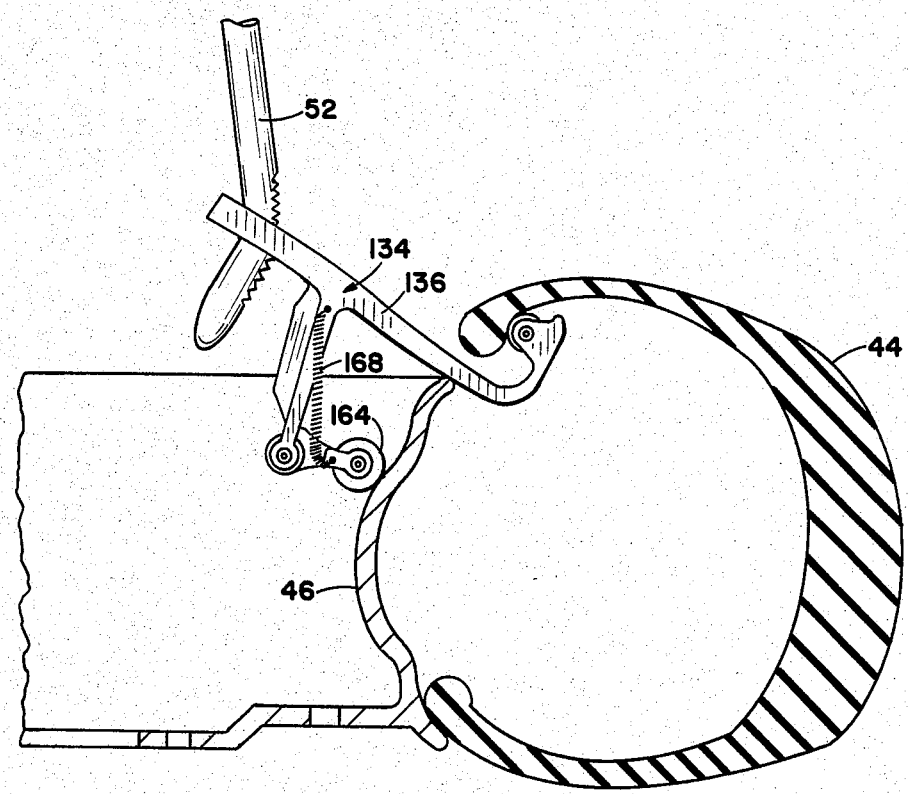
FIG. 23 is a view similar to FIGS. 21 and 22 showing the next succeeding step in the removal of the tire.
Figure 24:
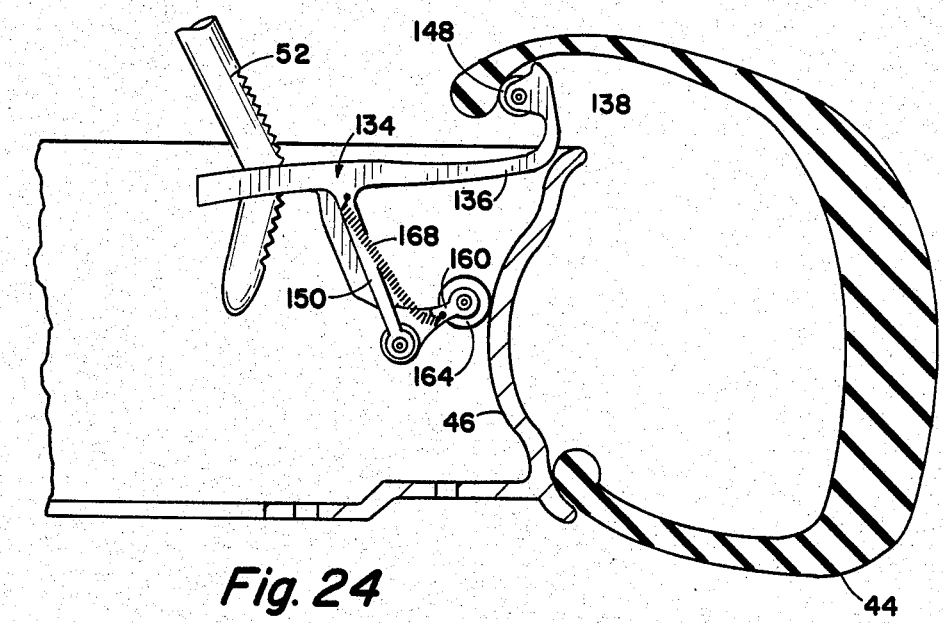
FIG. 24 is a view similar to FIGS. 21, 22 and 23 showing the next succeeding step in the removal of the tire.

FIGS. 21 through 24 illustrate the removal of the tire 44 from the wheel rim 46 by the use of the tool 134. The arcuate flange 138 and rollers 148 may be forced between the bead 48 and the wheel rim 46 by the foot 50 of the operator of the tool 154 in the manner as hereinbefore set forth wherein the arcuate flange 138 and rollers 148 are disposed in the interior of the tire 44 as particularly illustrated in FIG. 21. The lever means 52 may then be engaged with the bore 140 in the manner and for the purpose as hereinbefore set forth in connection with the tool 10, 56 and 94. The tool 134 is maneuvered with respect to the tire 44 and wheel rim 46 for positioning the roller 148 against the bead 48 as particularly shown in FIG. 22. The lever 52 may then be manually moved in a radial direction with respect to the wheel rim 46 toward an ultimate substantially diametrically disposed position with respect thereto as hereinbefore set forth. As the lever 52 is initially moved in said radial direction the body 136 is pivoted about the outer edge of the wheel rim 46 as shown in FIG. 23 whereby the rollers 148 lift the bead 48 in a direction away from the wheel rim 46. Simultaneously, the roller means 164 rolls axially inwardly along the inner periphery of the wheel rim 46. A continued movement of the lever arm 52 in said radial direction moves the tool 134 in such a manner that the rollers 148 and arcuate arms 138 completely remove the bead 48 from any engagement with the wheel rims 46 as will be evident in FIG. 24. In this position, the tire has been completely released with respect to engagement of the wheel 46 and may be easily completely removed therefrom.

As hereinbefore set forth, substantially any elongated lever means or bar may be utilized for manipulation of the tools 10, 56, 94 and 134. However, the lever or tool 52 as shown in FIGS. 25 and 26 are preferable to perform this operation. The tool 52 comprises an elongated rod member 172 terminating at one end in a curved portion 174 and at the opposite end in a flattened portion 176. The outer end of the curved or arcuate portion 174 is essentially pointed as shown at 178 for facilitating insertion of the tool of the lever 52 into the bore of the respective tire tool with which it is to be used. The outer periphery of the curved portion 176 is preferably serrated or provided with a plurality of spaced teeth 180 forming an arcuate ratchet means for the lever arm 52. The ratchet means 180 facilitates the engagement of the bar 52 with the bore of the respective tire tool with which it is to be used for facilitating the manipulation of the tire tool. The opposite end 176 of the tool or lever 52 may be utilized in lieu of the bead breaking tool 42 for initially breaking the strong engagement between the bead 48 and wheel 46 at the initiation of the tire removal operation as hereinbefore set forth.

Whereas it is essentially a simple operation to remove the tire completely from the wheel rim 46, once the bead has been removed therefrom as shown herein, it may be desirable to provide a tool for facilitating the installation of the opposite bead 48 on the wheel 46. FIGS. 27 and 28 illustrate such a tool. The tool generally indicated at 182 comprises a relatively slim substantially flat body 184 having one end thereof slightly arcuate as shown at 186. A bore 188 is provided in the proximity of the opposite ends thereof. In addition, a keeper means 190 is secured to the body 184 in any suitable manner for a purpose as will be hereinafter set forth. The keeper means 190 preferably comprises a flexible cable element 192 having a cross bar handle means 194 provided at the outer end thereof for facilitating manipulation thereof.

In use, for accomplishing the complete removal of the tire 44 from the wheel rim 46 the arcuate portion 186 of the tool 82 may be positioned against the tire bead 48 which is still in engagement, loosely, with the wheel rim 186 and the tool 52 or other similar lever means may be engaged with the bore 188 and manipulated for essentially trying or lifting the second bead readily from the engagement with the wheel rim 46. The keeper member 190 may be manually grasped by the handle means 194 during this final removal operation to preclude accidental loss of the tool 182 in the interior of the tire once the tire has been freed from engagement with the wheel rim 46.

From the foregoing it will be apparent that the present invention provides a novel tire tool for facilitating the removal of a tire from a wheel rim and particularly for facilitating the removal of a large tire from its associated wheel rim. The novel tool comprises a substantial flat body having an arcuate flange at one end thereof and a bore provided at the opposite end thereof. An angular arm is secured to or integral with the body and extends outwardly therefrom in an opposite direction with respect to the arcuate flange. A first plurality of roller members are journalled at the outer end of the arcuate flange and a second plurality of rollers are journalled at the outer end of the arm. The first rollers are adapted for engagement with the inner sidewall of the tire during the removal operation and the second rollers are adapted for riding axially along the wheel rim during the removal operation. The tool is initially inserted between the tire and the wheel rim and is pivoted by means of a lever apparatus for moving the second rollers axially along the wheel rim as the first rollers roll along the inner sidewall of the tire for flexing or deforming of the tire in a manner whereby the tire may be removed from engagement with the associated outer edge of the wheel rim. This releases the engagement of one entire tire bead with the wheel rim and the remaining removal of the tire therefrom may be readily accomplished by the use of suitable helper means or the like.

Whereas the present invention has been described in particular relation to the drawings attached hereto, it should be understood that other and further modifications, apart from those shown or suggested herein may be made within the spirit and scope of this invention.

What is claimed is:

1. A tire tool for removal of a tire from a wheel rim, said tire tool comprising a main body portion having a bore provided in the proximity of one end thereof, an arcuate flange provided at the opposite end thereof, first roller means journalled at the outer end of the arcuate flange, an arm member extending outwardly from one face of the main body portion and in a direction opposite the arcuate flange, second roller means journalled at the outer end of the arm member, bumper means provided on the tire tool for facilitating the release of the tire from the wheel rim during a tire removal operation, the bumper means being secured to the arm member, and wherein the bumper means comprises a plate member pivotally secured to the arm member, and stop means provided on the plate member for engagement with the arm member to limit the pivotal movement of the plate member in one direction.

2. A tire tool as set forth in claim 1 and including lever means engageable with the bore of the main body portion for facilitating manual manipulation of the tire tool during a tire removal operation.

3. A tire tool as set forth in claim 2 wherein said lever means comprises an elongated bar member having an arcuate portion at one end thereof for engagement with said bore.

4. A tire tool as set forth in claim 3 and including ratchet means provided on said arcuate portion of the bar member for facilitating the manipulation of the tire tool during a tire removal operation.

5. A tire tool as set forth in claim 3 and including a flattened portion provided at the opposite end of the elongated bar member for facilitating the initiation of the tire removal operation.

6. A tire tool for removal of a tire from a wheel rim, said tire tool comprising a main body portion having a bore provided in the proximity of one end thereof, an arcuate flange provided at the opposite end thereof, first roller means journalled at the outer end of the arcuate flange, an arm member extending outwardly from one face of the main body portion and in a direction opposite the arcuate flange, second roller means journalled at the outer end of the arm member, bumper means provided on the tire tool for facilitating the release of the tire from the wheel rim during a tire removal operation, and wherein the bumper means is secured to the main body and comprises a plate member pivotally secured to the main body, and spring means anchored between the plate member and the main body for constantly urging the plate member in one pivotal direction.

7. A tire tool for removal of a tire from a wheel rim, said tire tool comprising a main body portion having a bore provided in the proximity of one end thereof, an arcuate flange provided at the opposite end thereof, first roller means journalled at the outer end of the arcuate flange, an arm member extending outwardly from one face of the main body portion and in a direction opposite the arcuate flange, second roller means journalled at the outer end of the arm member, bumper means provided on the tire tool for facilitating the release of the tire from the wheel rim during a tire removal operation, the bumper means comprising first plate means secured to the main body, second plate means secured to the arm member, and wherein the first bumper means is pivotally secured to the main body, and the second plate means is pivotally secured to the arm member.

8. A tire tool as set forth in claim 7 and including spring means anchored between the main body and the first pivotal plate means for constantly urging the said first plate means in one pivotal direction.

9. A tire tool for removal of a tire from a wheel rim, said tire tool comprising a main body portion having a bore provided in the proximity of one end thereof, an arcuate flange provided at the opposite end thereof, first roller means journalled at the outer end of the arcuate flange, an arm member extending outwardly from one face of the main body portion and in a direction opposite the arcuate flange, second roller means journalled at the outer end of the arm member, bumper means provided on the tire tool for facilitating the release of the tire from the wheel rim during a tire removal operation, and wherein the second roller means comprises yoke means pivotally secured to the outer end of the arm member, and roller means journalled on the outer end of the yoke means for engagement with the wheel rim during a tire removal operation.

10. A tire tool as set forth in claim 9 and including spring means anchored between the yoke means and arm member.

* * * * *